US012792104B2

(12) United States Patent
(10) Patent No.: US 12,792,104 B2
(45) Date of Patent: Nov. 10, 2026

Yang et al.

(54) CONNECTING DEVICE AND ELECTRONIC DEVICE

(71) Applicant: Lenovo (Beijing) Limited, Beijing (CN)

(72) Inventors: Feng Yang, Beijing (CN); Detao You, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 113 days.

(21) Appl. No.: 18/898,631

(22) Filed: Sep. 26, 2024

(65) Prior Publication Data

US 2025/0110532 A1 Apr. 3, 2025

(30) Foreign Application Priority Data

Sep. 28, 2023 (CN) ........................ 202311286382.4

(51) Int. Cl.
*G06F 1/16* (2006.01)
*G06F 1/20* (2006.01)

(52) U.S. Cl.
CPC .............. *G06F 1/1681* (2013.01); *G06F 1/20* (2013.01); *G06F 2200/203* (2013.01)

(58) Field of Classification Search
CPC combination set(s) only.
See application file for complete search history.

(56) References Cited

U.S. PATENT DOCUMENTS 5,347,424 A * 9/1994 Akahane ................ G06F 1/166 248/688
6,053,589 A * 4/2000 Lin ...................... G06F 1/1616 312/271
6,097,592 A * 8/2000 Seo ...................... G06F 1/1616 361/679.55
6,097,595 A * 8/2000 Cipolla .................. G06F 1/166 248/688
7,926,781 B2 * 4/2011 Wang .................... G06F 1/1616 248/688
8,014,147 B2 * 9/2011 Chen ..................... G06F 1/1684 200/61.7
8,050,031 B2 * 11/2011 Wang .................... G06F 1/1681 361/679.55
8,220,771 B2 * 7/2012 Wang .................... G06F 1/1616 248/688
8,792,237 B2 * 7/2014 Guo ...................... G06F 1/1681 361/679.55
(Continued)

*Primary Examiner* — Lisa Lea-Edmonds
(74) *Attorney, Agent, or Firm* — ANOVA LAW GROUP, PLLC

(57) ABSTRACT

A connecting device that includes a first rotating shaft, a second rotating shaft, and an adjustment assembly. The first rotating shaft is used to connect with a first body. The second rotating shaft is parallel to the first rotating shaft and is used to connect with a second body. The adjustment assembly is rotatably matched with the second rotating shaft. A rotation angle of the second rotating shaft relative to the first rotating shaft changes to cause a target object of the adjustment assembly to move relative to the second rotating shaft, the target object reciprocating along a first direction to change a target distance with the second rotating shaft. The first direction and an axial direction of the second rotating shaft form an angle.

9 Claims, 8 Drawing Sheets

(56) References Cited

U.S. PATENT DOCUMENTS

| | | | | |
|---|---|---|---|---|
| 8,879,251 | B2 * | 11/2014 | Hsiu | H05K 5/03 361/679.59 |
| 9,030,820 | B2 * | 5/2015 | Guo | G06F 1/1637 361/679.59 |
| 9,047,058 | B2 * | 6/2015 | Yu | G06F 1/1679 |
| 9,354,669 | B2 * | 5/2016 | Chen | G06F 1/1618 |
| 9,436,230 | B2 * | 9/2016 | Lee | G06F 1/1681 |
| 9,582,048 | B2 * | 2/2017 | Ho | G06F 1/166 |
| 9,983,636 | B2 * | 5/2018 | Ho | G06F 1/1616 |
| 10,241,540 | B2 * | 3/2019 | Chuang | G06F 1/203 |
| 10,503,214 | B2 * | 12/2019 | Jiang | G06F 1/166 |
| 10,642,309 | B2 * | 5/2020 | Cheng | G06F 1/203 |
| 10,831,245 | B1 * | 11/2020 | Miyamoto | G06F 1/1681 |
| 11,169,575 | B2 * | 11/2021 | Elsey | G06F 1/1681 |
| 11,269,383 | B2 * | 3/2022 | Huang | H05K 7/16 |
| 11,714,462 | B2 * | 8/2023 | Shin | G06F 1/166 361/679.27 |
| 12,204,380 | B2 * | 1/2025 | Park | G06F 1/1681 |
| 12,274,014 | B2 * | 4/2025 | Li | H05K 5/0226 |
| 12,379,750 | B2 * | 8/2025 | Yamamoto | G06F 1/1616 |
| 2011/0292605 | A1 * | 12/2011 | Chen | G06F 1/1681 16/303 |
| 2013/0308268 | A1 * | 11/2013 | Tani | G06F 1/1679 361/679.02 |
| 2014/0063700 | A1 * | 3/2014 | Kawada | G06F 1/166 361/679.01 |
| 2014/0111925 | A1 * | 4/2014 | Chang | G06F 1/1616 361/679.01 |
| 2021/0089077 | A1 * | 3/2021 | Wang | G06F 1/3287 |
| 2022/0397933 | A1 * | 12/2022 | Cha | G06F 1/1681 |
| 2023/0084065 | A1 * | 3/2023 | Park | G06F 1/16 16/341 |
| 2023/0376082 | A1 * | 11/2023 | Yamamoto | H05K 5/02 |
| 2024/0103570 | A1 * | 3/2024 | Huang | H05K 5/0226 |
| 2024/0152187 | A1 * | 5/2024 | Wen | G06F 1/1616 |
| 2025/0110532 | A1 * | 4/2025 | Yang | G06F 1/1616 |

* cited by examiner

CONNECTING DEVICE AND ELECTRONIC DEVICE

CROSS-REFERENCES TO RELATED APPLICATION

This application claims priority to Chinese Patent Application No. 202311286382.4 filed on Sep. 28, 2023, the entire content of which is incorporated herein by reference.

FIELD OF TECHNOLOGY

The present disclosure relates to the technical field of electronic equipment and, more specifically, to a connecting device and an electronic device.

BACKGROUND

A connecting device is generally arranged between a first body and a second body of an electronic device for the electronic device to present various states. The second body of the electronic device is in full contact with the bearing surface such that heat of the electronic device cannot be quickly dissipated. At the same time, when the first body and the second body are tilted, the first body is prone to bump against the bearing surface.

SUMMARY

One aspect of this disclosure provides a connecting device. The connecting device includes a first rotating shaft, a second rotating shaft, and an adjustment assembly. The first rotating shaft is used to connect with a first body. The second rotating shaft is parallel to the first rotating shaft and is used to connect with a second body. The adjustment assembly is rotatably matched with the second rotating shaft. A rotation angle of the second rotating shaft relative to the first rotating shaft changes to cause a target object of the adjustment assembly to move relative to the second rotating shaft, the target object reciprocating along a first direction to change a target distance with the second rotating shaft. The first direction and an axial direction of the second rotating shaft form an angle.

Another aspect of this disclosure provides an electronic device. The electronic device includes a first body, a connecting device, and a second body. The first body has a first surface and a second surface disposed opposite to each other. The second body has a third surface and a fourth surface disposed opposite to each other. The second body is connected to the first body through the connecting device. During a process of the first body flipping relative to the second body to a target state, a supporting surface of the second body for contacting a bearing surface is adjusted to be close to the second body. The target state is a state in which the first surface of the first body serves as the bearing surface in contact with the supporting surface of the second body.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

Figure 1:
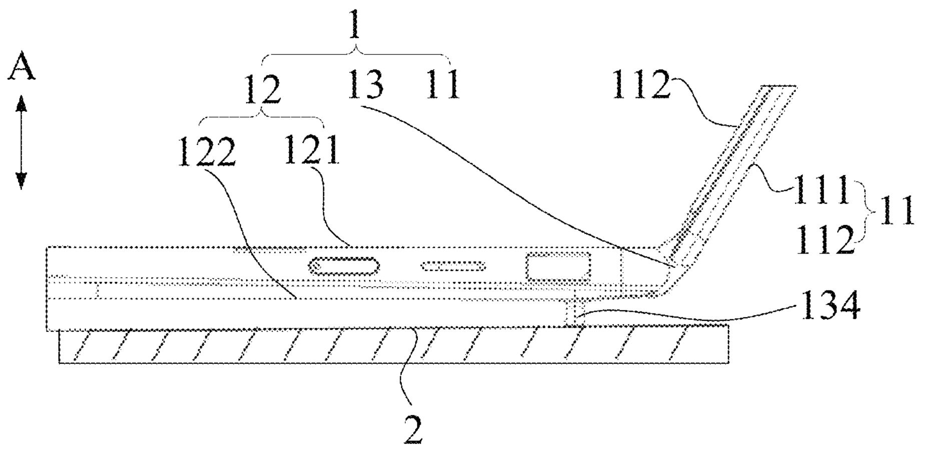
FIG. 1 is a schematic structural diagram of a first body and a second body in a working state according to an embodiment of the present disclosure.
Figure 2:
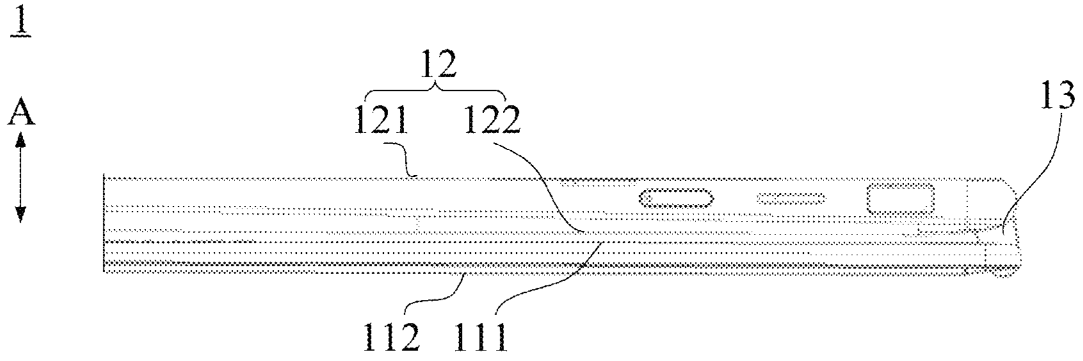
FIG. 2 is a schematic structural diagram of the first body and the second body in a target state according to an embodiment of the present disclosure.

Reference numerals in the drawings include 1. Electronic Device; 11. First Body; 111. First Surface; 112. Second Surface; 12. Second Body; 121. Third Surface; 122: Fourth Surface; 13. Connecting Device; 131. First Rotating Shaft; 132. Second Rotating Shaft; 1321. First Cam; 1322. Second Cam; 133. Adjustment Assembly; 1331. Adjustment Bracket; 13311. First Limiting Groove; 13312. Second Limiting Groove; 13313. Through Hole; 1332. First Drive Assembly; 13321. Cam; 13322. First Connecting Rod; 13323. Cam Bracket; 1333. Second Drive Assembly; 13331. Target Control Block; 133311. Target Slot; 1333111. First Slide Slot; 1333112. Second Slide Slot; 1333113. Third Slide Slot; 13332. Target Object; 133321. Sliding Member; 1334. Third Drive Assembly; 13341. Second Connecting Rod; 13342. First Fulcrum; 13343. Second Fulcrum; 134. Support; 135. Linkage Mechanism; 1351. First Gear; 1352. Second Gear; 1353. Transmission Gear; 1354. First Spiral Groove; 1355. Second Spiral Groove; 13551. First Groove; 13552. Second Groove; 13553. Third Groove; 1356. Guide; 136. Torque Assembly; 2. Bearing Surface; A. First Direction; B. Second Direction; and C. Third Direction.

DETAILED DESCRIPTION

It should be noted that, without conflict, embodiments and technical features in the embodiments can be combined with each other. Detailed descriptions in specific embodiments should be understood as an explanation of the gist of the present disclosure and should not be regarded as undue limitation of the present disclosure.

To make the purpose, technical solutions, and advantages of the embodiments of the present disclosure clearer, specific technical solutions of the present disclosure will be further described in detail below in conjunction with accompanying drawings in the embodiments of the present disclosure. The following examples are used to illustrate the present disclosure but are not intended to limit the scope of the present disclosure.

In the embodiments of the present disclosure, terms "first" and "second" are only used for descriptive purposes and cannot be understood as indicating or implying relative importance or implicitly specifying the quantity of indicated technical features. Therefore, a feature defined as "first" or "second" may explicitly or implicitly include one or more of the features. In the description of the present disclosure, "a plurality" means two or more, unless specifically limited otherwise.

In addition, in the present disclosure, directional terms such as "upper", "lower", "left" and "right" are defined with respect to the orientation in which components are schematically positioned in the accompanying drawings. It should be understood that the orientation terms are relative concepts and are used for relative description and clarification and may change correspondingly according to a change in a position in which a component is placed in the accompanying drawings.

In the embodiments of the present disclosure, unless otherwise explicitly specified and limited, the term "connection" should be understood in a broad sense. For example, the "connection" may be a fixed connection, a detachable connection, or an integral connection; and may be a direct connection or an indirect connection using an intermediate medium.

In the embodiments of the present disclosure, terms "include", "comprise" or any other variations thereof are intended to cover a non-exclusive inclusion such that a process, method, article, or apparatus that includes a list of elements includes not only those elements, but also others not expressly listed elements, or elements inherent to such process, method, article, or apparatus. Without further limitation, an element defined by the statement "comprises a . . . " does not exclude the presence of additional identical elements in a process, method, article or apparatus that includes that element.

In the embodiments of the present disclosure, words such as "exemplary" or "for example" are used to mean an example, illustration or description. Any embodiment or design described herein as "exemplary" or "for example" is not to be construed as preferred or advantageous over other embodiments or designs. Rather, a use of words such as "exemplary" or "for example" is intended to present related concepts in a concrete manner.

Refer to FIG. 1, FIG. 2, FIG. 3 and FIG. 7. An embodiment of the present disclosure provides an electronic device 1. The electronic device can be a desktop computer, a mobile phone, or other type of product. It should be noted that a type of the electronic device is not limited herein. More specifically, the electronic device 1 includes a first body 11, a second body 12 and a connecting device 13. The first body 11 may be provided with a display, and the second body 12 may be provided with a processor, a keyboard, etc. Of course, the first body 11 may also be provided with a processor, a keyboard, etc., and the second body 12 may also be provided with a display. The present disclosure does not limit the devices disposed on the first body 11 and the second body 12. In one embodiment of the present disclosure, the first body 11 may be provided with a display, the second body 12 may be provided with a processor and a keyboard, etc., and the second body 12 may also be provided with a display.

The connecting device 13 is used to connect the first body 11 and the second body 12 such that the first body 11 and the second body 12 can be flipped relative to each other through the connecting device. As demands for the diversity of postures of the electronic device 1 increases, the connecting device 13 has the function of allowing the first body 11 and the second body 12 to be buckled together, and the first body 11 may also be tilted at a certain angle relative to the second body 12 to present different postures.

For example, the first body 11 and the second body 12 may be relatively opened and closed based on the connecting device 13. That is, the first body 11 and the second body 12 can be rotated to engage and open with each other through a first rotating shaft 131 and a second rotating shaft 132. When the first body 11 and the second body 12 are buckled together until the angle between them is 0°, the first body 11 and the second body 12 are in a closed state. When the first body 11 and the second body 12 rotate relative to each other to open at a certain angle, that first body 11 and the second body 12 are in an open state. That is, the first body 1 and the second body 2 can switch between a closed state and an open state during the relative opening and closing process.

For example, the first body 11 includes a first surface 111 and a second surface 112. The display device is disposed on the first surface 111 of the first body 11. The second body 12 includes a third surface 121 and a fourth surface 122 disposed opposite to each other. When the first body 11 is at a first angle relative to the second body 12, that is, 0°, which can also be referred to as the initial state, the second surface 112 of the first body 11 is buckled on the third surface 121 of the second body 12. When the first body 11 is at a second angle relative to the second body 12, that is, greater than 0° and less than 360°, which can also be referred to as the working state, the first body 11 is tilted at a certain angle relative to the second body 12, and the first surface 111 and the second surface 112 of the first body 11 are not engaged with the third surface 121 and the fourth surface 122 of the second body 12. When the first body 11 is at a third angle relative to the second body 12, that is, equal to 360°, which can be referred to as the target state, the first surface 111 of the first body 11 is buckled onto the second surface 112 of the second body 12.

The connecting device 13 includes the first rotating shaft 131, the second rotating shaft 132, and an adjustment assembly 133. The first rotating shaft 131 may be used to connect with the first body 11, and the second rotating shaft 132 may be parallel to the first rotating shaft 131 and used to connect with the second body 12. The second body 12 of the electronic device is in full contact with the bearing surface, and the heat of the electronic device cannot be quickly dissipated. At the same time, when the first body 11 and the second body 12 are tilted, the first body 11 can easily collide with the bearing surface. In the present disclosure, by configuring the fourth surface 122, the adjustment assembly 133 and the second rotating shaft 132 being configured to rotate together, the rotation angle of the second rotating shaft 132 relative to the first rotating shaft 131 changes the movement of a target object 13332 of the adjustment assembly 133 relative to the second rotating shaft 132, and the target object 13332 reciprocates along the first direction A to change the target distance with the second rotating shaft 132. The first direction A and the axial direction of the second rotating shaft 132 form an angle, which is equivalent to lifting the second body 12, thereby lifting the electronic device. In this way, the heat of the electronic device can be quickly dissipated, and at the same time, the first body 11 is less likely to collide with the bearing surface.

Consistent with the present disclosure, the connecting device 13 includes a first rotating shaft 131 for connecting with the first body 11, a second rotating shaft 132 for connecting with the second body 12, and the second rotating shaft 132 and the first rotating shaft 131 meet the parallel condition. The rotation angle of the second rotating shaft 132 relative to the first rotating shaft 131 can be obtained by the rotational coordination between the first rotating shaft 131 and the second rotating shaft 132. The coordinated rotation can be understood that the first rotating shaft 131 and the second rotating shaft 132 rotating synchronously. The coordinated rotation can also be understood that the first rotating shaft 131 and the second rotating shaft 132 rotate asynchronously. That is, when the first body 11 rotates to a present angle, the second rotating shaft 132 rotates and the first body 11 stops rotating, or when the second rotating shaft 132 rotates to a preset angle, the first body 11 rotates and the second rotating shaft 132 stops rotating. In this way, the second rotating shaft 132 can rotate relative to the first rotating shaft 131 such that the first body 11 and the second body 12 are at different angles, thereby presenting different poses to meet people's diverse needs for the electronic device 1. In addition, the connecting device 13 further includes an adjustment assembly 133, which is rotatably matched with the second rotating shaft 132. The change in the rotation angle of the second body 12 relative to the first rotating shaft 131 can change the movement of the target object 13332 of the adjustment assembly 133 relative to the second rotating shaft 132. The target object 13332 can reciprocate along the first direction A to change the target distance with the second rotating shaft 132, and the first direction A and the axial direction of the second rotating shaft 132 have an angle. In other words, the first direction A can also be referred to as the thickness direction of the second body 12. The rotation angle of the second rotating shaft 132 relative to the first rotating shaft 131 can change the reciprocating motion of the target object 13332 of the adjustment assembly 133, thereby changing the target distance from the second rotating shaft 132. That is, when the adjustment assembly 133 contacts the bearing surface 2, the overall height of the target object 13332 of the adjustment assembly 133 and the bearing surface in the first direction A, and the rotation angle of the second rotating shaft 132 relative to the first rotating shaft 131 can also change the distance between the second body 12 and the bearing surface 2. In this way, it is equivalent to lifting the second body 12, thereby lifting the entire electronic device 1 in the first direction A. The side of second body 12 with the adjustment assembly 133 and the second rotating shaft 132 is not completely in contact with the bearing surface 2, such that the heat of the electronic device 1 can be quickly dissipated. At the same time, when the second rotating shaft 132 rotates relative to the first rotating shaft 131, the distance between the first body 11 and the bearing surface 2 gradually decreases due to the influence of the rotation angle, and it is easy to collide with the bearing surface 2. However, the rotation angle of the second rotating shaft 132 relative to the first rotating shaft 131 can change the movement of the target object 13332 relative to the second rotating shaft 132, and the target object 13332 can reciprocate along the first direction A to change the target distance with the second rotating shaft 132, thereby reducing the collision between the first body 11 and the bearing surface 2.

In conventional technology, due to the arrangement of the connecting device 13 between the first body 11 and the second body 12, the second body 12 of the electronic device 1 is completely in contact with the bearing surface 2, and the heat of the electronic device 1 cannot be quickly dissipated. At the same time, when the first body 11 and the second body 12 are tilted, the first body 11 can easily collide with the bearing surface 2. In the present disclosure, by providing the adjustment assembly 133, and the adjustment assembly 133 and the second rotating shaft 132 can rotate together, the rotation angle of the second rotating shaft 132 relative to the first rotating shaft 131 can change the movement of the target object 13332 of the adjustment assembly 133 relative to the second rotating shaft 132, and the target object 13332 can reciprocate along the first direction A to change the target distance with the second rotating shaft 132. The first direction A and the axial direction of the second rotating shaft 132 have an angle, such that the adjustment assembly 133 can change the spacing in the first direction A, which is equivalent to lifting the second body 12, thereby lifting the electronic device 1. In this way, the heat of the electronic device 1 can be quickly dissipated, and at the same time, the first body 11 is less likely to collide with the bearing surface 2.

For example, since the first rotating shaft 131 is connected to the first body 11, the second rotating shaft 132 and the first rotating shaft 131 meet the parallel condition, and the second rotating shaft 132 is connected to the second body 12. The rotation angle of the second rotating shaft 132 relative to the first rotating shaft 131 can change the state of the first body 11 and the second body 12, that is, the angle formed between the first body 11 and the second body 12. At the same time, the rotation angle of the second rotating shaft 132 relative to the first rotating shaft 131 will also change the movement of the target object 13332 of the adjustment assembly 133 relative to the second rotating shaft 132, and the target object 13332 can reciprocate along the first direction A to change the target distance of the second rotating shaft 132. In other words, the target distance between the target object 13332 and the second rotation axis along the first direction A can be changed.

It should be noted that the rotation angle of the second rotating shaft 132 relative to the first rotating shaft 131 can change such that the target object 13332 of the adjustment assembly 133 can move relative to the second rotating shaft 132, and the target object 13332 can reciprocate along the first direction A to change the target distance with the second rotating shaft 132. The change of the target distance has no sequence relationship with the rotation angle of the first rotating shaft 131 and the second rotating shaft 132. For example, when the first rotating shaft 131 and the second rotating shaft 132 rotate, the target object 13332 may synchronously reciprocate along the first direction A to change the target distance with the second rotating shaft 132. That is, the target distance changes synchronously with the rotation angle. In another example, after the rotation of the first rotating shaft 131 and the second rotating shaft 132 is completed, the target object 13332 may synchronously reciprocate along the first direction A to change the target distance with the second rotating shaft 132. That is, after the rotation angle is completed, the target distance changes.

The rotation angle of the second rotating shaft 132 relative to the first rotating shaft 131 can change such that the target object 13332 of the adjustment assembly 133 can move relative to the second rotating shaft 132, and the target object 13332 can reciprocate along the first direction A to change the target distance with the second rotating shaft 132. During the rotation process, the gradual increase in the rotation angle does not indicate that the target distance will gradually increase. Similarly, the gradual decrease in the rotation angle does not indicate that the target distance will gradually decrease. For example, when the rotation angle of the second rotating shaft 132 relative to the first rotating shaft 131 increases, the target distance may first increase and then decrease, or first decrease, then increase, and then remain unchanged. That is, the changing trend of the rotation angle has no correlation with the changing trend of the target distance.

In addition, the rotation angle of the second rotating shaft 132 relative to the first rotating shaft 131 can change such that the target object 13332 of the adjustment assembly 133 can move relative to the second rotating shaft 132, and the target object 13332 can reciprocate along the first direction A to change the target distance with the second rotating shaft 132. During the rotation process, the change in rotation angle does not mean the target distance also needs to change. For example, when the second rotating shaft 132 rotates relative to the first rotating shaft 131, the target distance may remain unchanged at first and then change.

It should be noted that the following is an example of how the rotation angle of the second rotating shaft 132 relative to the first rotating shaft 131 is changed to make the target object 13332 of the adjustment assembly 133 move relative to the second rotating shaft 132, and how the target object 13332 reciprocates along the first direction A to change the target distance with the second rotating shaft 132.

Refer to FIG. 1, FIG. 2, FIG. 7, FIG. 8 and FIG. 9. The rotation position of the second rotating shaft 132 relative to the first rotating shaft 131 may include at least a first position and a second position. During the rotation from the first position to the second position, the target object 13332 of the adjustment assembly 133 moves relative to the second rotating shaft 132, and the target object 13332 may reciprocate along the first direction A to change the target distance between the adjustment assembly 133 and the second rotating shaft 132.

In addition, the rotation position of the second rotating shaft 132 relative to the first rotating shaft 131 may also include a third position, which is located between the first position and the second position. During the rotation from the first position to the third position, the target distance between the adjustment assembly 133 and the second rotating shaft 132 may increase, and during the rotation from the third position to the second position, the target distance between the adjustment assembly 133 and the second rotating shaft 132 may decrease.

When the second rotating shaft 132 rotates from the first position to the second position relative to the first rotating shaft 131, the second rotating shaft 132 may rotate to a first preset angle relative to the first rotating shaft 131, driving the target object 13332 of the adjustment assembly 133 to move along the first direction A. When the second rotating shaft 132 rotates to a second preset angle relative to the first rotating shaft 131, the target object 13332 of the adjustment assembly 133 may move in the opposite direction of the first direction A. The first preset angle and the second preset angle may be different angles.

For example, when the rotation position of the second rotating shaft 132 relative to the first rotating shaft 131 is the first position, the first body 11 and the second body 12 may be in the initial state, which can also be referred to as the non-working state. That is, the first body 11 and the second body 12 have a first angle, and the first angle is 0°. At this time, the target distance between the target object 13332 of the adjustment assembly 133 and the second rotating shaft 132 can be a first target distance. It should be noted that the target distance between the target object 13332 of the adjustment assembly 133 and the second rotating shaft 132 can be a first target distance, and the target object 13332 of the adjustment assembly 133 can be flush with, extendable, or retractable relative to the second body 12, which is not limited in the embodiments of the present disclosure.

When the second rotating shaft 132 is in the third position relative to the first rotating shaft 131, the first body 11 and the second body 12 may both be in the working state. That is, the first body 11 and the second body 12 have a second angle, which is greater than 0° and less than 360°. At this time, the target distance between the target object 13332 of the adjustment assembly 133 and the second rotating shaft 132 may be the second target distance, and the second target distance may be greater than the first target distance. It should be noted that when the target distance between the target object 13332 of the adjustment assembly 133 and the second rotating shaft 132 is the second target distance, at this time, the target object 13332 of the adjustment assembly 133 may extend relative to the second body 12. For example, the second angle between the first body 11 and the second body 12 may be between 110° and 130°.

When the second rotating shaft 132 is in the second position relative to the first rotating shaft 131 such that the first body 11 and the second body 12 are in the target state, which can be referred to as the working state or the non-working state, that is, the first body 11 and the second body 12 have third angle, and the third angle is 360°. At this time, the target distance between the target object 13332 of the adjustment assembly 133 and the second rotating shaft 132 may be the third target distance. The third target distance may be smaller than the second target distance, but there is no relationship between the third target distance and the first target distance. The third target distance may be larger than the first target distance, and the third target distance may be equal to the first target distance. It should be noted that when the target distance between the target object 13332 of the adjustment assembly 133 and the second rotating shaft 132 is the third target distance, the target object 13332 of the adjustment assembly 133 can be flush with the second body 12, or it can be retracted to ensure that the first body 11 and the second body 12 are at the third angle.

When the first body 11 and the second body 12 change from the initial state to the working state, the target distance between the target object 13332 of the adjustment assembly 133 and the second rotating shaft 132 may change from the first target distance to the second target distance. That is, the distance between the target object 13332 of the adjustment assembly 133 and the second rotating shaft 132 in the first direction A may gradually increase. That is, the distance between the second body 12 and the bearing surface 2 can gradually increase, which is equivalent to lifting the second body 12, thereby lifting the electronic device 1, which reduces the chance of the first body 11 and the bearing surface 2 colliding with each other during the rotation of the first body 11 and the second body 12.

Similarly, when the first body 11 and the second body 12 rotate from the working state to the initial state, the target distance between the target object 13332 of the adjustment assembly 133 and the second rotating shaft 132 may change from the second target distance to the first target distance. That is, the distance between the target object 13332 of the adjustment assembly 133 and the second rotating shaft 132 in the first direction A may gradually decrease. That is, the distance between the second body 12 and the bearing surface 2 may gradually decrease, which is equivalent to lowering the lifted second body 12, thereby lowering the lifted electronic device 1, and reducing the space occupied by the electronic device 1.

When the first body 11 and the second body 12 change from the working state to the target state, the target distance between the target object 13332 of the adjustment assembly 133 and the second rotating shaft 132 may change from the second target distance to the third target distance. That is, the distance between the target object 13332 of the adjustment assembly 133 and the second rotating shaft 132 in the first direction A may gradually decrease. That is, the distance between the second body 12 and the bearing surface 2, which is equivalent to lowering the lifted second body 12, thereby lowering the lifted electronic device 1, and reducing the space occupied by the electronic device 1. At the same time, it is also convenient for the first body 11 and the second body 12 to be in the target state.

When the first body 11 and the second body 12 change from the initial state to the target state, the target distance between the target object 13332 of the adjustment assembly 133 and the second rotating shaft 132 may change from the first target distance to the second target distance, and then change from the second target distance to the third target distance. That is, the distance between the target object 13332 of the adjustment assembly 133 and the second rotating shaft 132 in the first direction A may increase and then decrease to complete the lifting and lowering of the second body 12.

When the first body 11 and the second body 12 change from the initial state to the target state, the target distance between the target object 13332 of the adjustment assembly 133 and the second rotating shaft 132 may change from the third target distance to the second target distance, and then change from the second target distance to the first target distance. That is, the distance between the target object 13332 of the adjustment assembly 133 and the second rotating shaft 132 in the first direction A may first decrease, and then decrease again to complete the lifting and lowering of the second body 12.

Similarly, when the first body 11 and the second body 12 rotate from the target state to the working state, the target distance between the target object 13332 of the adjustment assembly 133 and the second rotating shaft 132 may change from the third target distance to the second target distance. That is, the distance between the target object 13332 of the adjustment assembly 133 and the second rotating shaft 132 in the first direction A may gradually increase. That is, the distance between the second body 12 and the bearing surface 2 may gradually increase, which is equivalent to lifting the second body 12, thereby lifting the electronic device 1, reducing the chance of collision between the first body 11 and the bearing surface 2 during the state change of the first body 11 and the second body 12.

In some embodiments, since the first rotating shaft 131 and the second rotating shaft 132 cannot stay at a certain angle for an extended period of time during the rotation process, the first body 11 and the second body 12 cannot stay in a certain state for an extended period of time. Correspondingly, in some embodiments, the connecting device 13 may further include a torque assembly 136. The first rotating shaft 131 and the second rotating shaft 132 may respectively pass through the torque assembly 136 matched therewith, and the torque assembly 136 of the first rotating shaft 131 and the torque assembly 136 of the second rotating shaft 132 may be correspondingly arranged, and may be used to provide a torsion for the first rotating shaft 131 to rotate relative to the second rotating shaft 132 to a certain angle.

In other embodiments, refer to FIGS. 7-11. The adjustment assembly 133 further includes a first drive assembly 1332 and a second drive assembly 1333. The first drive assembly 1332 is connected to the second rotating shaft 132, and the first drive assembly 1332 can reciprocate relative to the second rotating shaft 132 along a second direction B with a first displacement. The second drive assembly 1333 cooperates with the first drive assembly 1332 to convert the first displacement of the first drive assembly 1332 in the second direction B into a second displacement of the second drive assembly 1333 in the first direction A. The second drive assembly 1333 can reciprocate relative to the second rotating shaft 132 along the first direction A to change the target distance. The second direction B may be the same as the axial direction of the second rotating shaft 132.

It should be noted that if only the second drive assembly 1333 is set to generate the second displacement in the first direction A, due to the size limitation of the second body 12 in the first direction A, the second displacement generated by the second drive assembly 1333 in the first direction A may be limited by the space, thereby making the change of the target distance limited. Therefore, the first drive assembly 1332 is provided on the basis of the second drive assembly 1333, and the second drive assembly 1333 can cooperate with the first drive assembly 1332 to convert the first displacement of the first drive assembly 1332 in the second direction B into the second displacement of the second drive assembly 1333 in the first direction A. The second drive assembly 1333 can reciprocate relative to the second rotating shaft 132 along the first direction A to change the target distance, which drives the second drive assembly 1333 to move in the first direction A, thereby reducing the possibility that the second drive assembly 1333 is restricted by the movement space in the first direction A, thereby resulting in a relatively small change in the target distance.

For example, when the second rotating shaft 132 rotates to the first preset angle relative to the first rotating shaft 131, the target object 13332 of the adjustment assembly 133 moves along the first direction A. When the second rotating shaft 132 rotates to a second preset angle relative to the first rotating shaft 131, the target object 13332 of the adjustment assembly 133 moves in the opposite direction of the first direction A. The first preset angle and the second preset angle may be different angles. It should be noted that the present disclosure does not limit the size relationship between the first preset angle and the second preset angle.

In some embodiments, the adjustment assembly 133 may include an adjustment bracket 1331, a first drive assembly 1332, and a second drive assembly 1333. The adjustment bracket 1331 may be fixedly connected to the second rotating shaft 132, and the first drive assembly 1332 may be connected to the adjustment bracket 1331. It should be noted that the first drive assembly 1332 may be connected to the second rotating shaft 132 through the adjustment bracket 1331 in the adjustment assembly 133, and the first drive assembly 1332 may reciprocate relative to the second rotating shaft 132 along the second direction B, with the first displacement. The second drive assembly 1333 may cooperate with the first drive assembly 1332 to convert the first displacement of the first drive assembly 1332 in the second direction B into the second displacement of the second drive assembly 1333 in the first direction A. The second drive assembly 1333 may perform a reciprocating motion along the first direction A relative to the second rotating shaft 132 to change the target distance.

The first drive assembly 1332 may be connected to the adjustment bracket 1331, and the first drive assembly 1332 may move back and forth relative to the second rotating shaft 132 along the second direction B, with the first displacement. The second drive assembly 1333 may cooperate with the first drive assembly 1332 to convert the first displacement of the first drive assembly 1332 in the second direction B into the second displacement of the second drive assembly 1333 in the first direction A. It should be noted that the present disclosure does not limit the specific structure of the first drive assembly 1332 and the second drive assembly 1333. Similarly, the present disclosure does not limit the specific structure of the second drive assembly 1333 and the first drive assembly 1332, as long as the first drive assembly 1332 can move relative to the adjustment bracket 1331 along the second direction B, thereby driving the second drive assembly 1333 to move relative to the adjustment bracket 1331 in the first direction A.

It should be noted that when the first body 11 and the second body 12 are in the working state, that is, a second angle is formed, and the second angle is greater than 0° and less than 360°. When the second angle range changes, the change in the target distance between the target object 13332 of the adjustment assembly 133 and the second rotating shaft 132 has no correlation with the change in the angle. That is, the target distance can increase as the angle increases, or it can decrease as the angle increases.

For example, refer to FIGS. 8-12. The adjustment bracket 1331 includes a first limiting groove 13311, and the first drive assembly 1332 includes a cam 13321. The cam 13321 is connected to the second rotating shaft 132. A first cam 1321 and a second cam 1322 are rotatably matched with the cam 13321, and the first cam 1321 and the second cam 1322 are arranged on the second rotating shaft 132. The first cam 1321 and the second cam 1322 are symmetrically arranged on both sides of the cam 13321 and abut against both sides of the cam 13321. The first end of a first connecting rod 13322 is connected to the cam 13321, and the second end of the first connecting rod 13322 is disposed in the first limiting groove 13311. The cam 13321 moves relative to the second rotating shaft 132 along the second direction B, thereby driving the second end of the first connecting rod 13322 to move in the first limiting groove 13311 along the second direction B to generate the first displacement. Through the cooperation between the cam 13321 and the first cam 1321 and the second cam 1322 of the second rotating shaft 132, the rotation of the second rotating shaft 132 can cause the cam 13321 to move along the second direction B relative to the second rotating shaft 132 to drive the second end of the first connecting rod 13322 to move in the first limiting groove 13311 along the second direction B and generate the first displacement. The operation is easy and it is convenient to manufacture.

In some embodiments, when the first body 11 and the second body 12 are switched from the initial state to the target state or from the initial state to the working state through the connecting device 13, the first cam 1321 may abut against the cam 13321 and move along the second direction B to cause the second end of the first connecting rod 13322 to move in the first limiting groove 13311 to generate the first displacement.

When the first body 11 and the second body 12 are switched from the working state to the target state or from the working state to the initial state through the connecting device 13, the second cam 1322 may abut against the cam 13321 and move in the opposite direction of the second direction B to cause the second end of the first connecting rod 13322 to move in the first limiting groove 13311. The first cam 1321 and the second cam 1322 are symmetrically arranged on both sides of the cam 13321 and abut against both sides of the cam 13321. Through the cooperation between the cam 13321 and the first cam 1321 and the second cam 1322 of the second rotating shaft 132, the first connecting rod 13322 can reciprocate in the first limiting groove 13311 along the second direction B to generate the first displacement.

Based on this, if the first end of the first connecting rod 13322 is connected to the cam 13321 through a cam bracket 13323, the cam 13321 can move along the second direction B relative to the second rotating shaft 132 to drive the second end of the first connecting rod 13322 to move in the first limiting groove 13311 along the second direction B to generate the first displacement. During the movement, the movement of the first connecting rod 13322 is likely to damage the cam 13321, and the cam 13321 needs to be adapted to the first cam 1321 and the second cam 1322, therefore, the replacement and maintenance cost of the cam 13321 is relatively high. In some embodiments, the first drive assembly 1332 may include a cam bracket 13323, and the cam 13321 may be connected to the first end of the first connecting rod 13322 through the cam bracket 13323. In this way, the cam 13321 moving relative to the second rotating shaft 132 in the second direction B, can be changed to the cam bracket 13323 moving relative to the second rotating shaft 132 in the second direction B, thereby driving the second end of the first connecting rod 13322 to move in the first limiting groove 13311 along the second direction B. The first connecting rod 13322 may be connected to the adjustment bracket 1331 through an elastic member. The elastic member provides a force for the second end of the first connecting rod 13322 to move in the first limiting groove 13311 along the second direction B. The elastic member may be a spring. It should be noted that the present disclosure does not limit the shape of the first limiting groove 13311 on the adjustment bracket 1331, which can be a long strip, a circle, a square, etc., as long as the second end of the first connecting rod 13322 can move along the second direction B in the first limiting groove 13311.

Refer to FIG. 8, FIG. 9, FIG. 10, FIG. 13 and FIG. 14. The second drive assembly 1333 includes a target control block 13331, and a target slot 133311 is formed on the target control block 13331. The target object 13332 may be a target rod (same reference numerals as the target object), and the first end of the target rod 13332 may be movably disposed in the target slot 133311. The target rod 13332 can be pulled to move in the first direction A by changing the height difference of the target slot 133311, thereby changing the target distance between the second end of the target rod 13332 and the second rotating shaft 132 in the first direction A.

Based on this, a through hole 13313 may be arranged on the adjustment bracket 1331. The target rod 13332 can move relative to the adjustment bracket 1331 in the first direction A through the through hole 13313. The target control block 13331 is provided with a target slot 133311. The first end of the target rod 13332 can be movably disposed in the target slot 133311, and the target rod 13332 can be pulled up and down in the first direction A by the change of the height difference of the target slot 133311 to change the distance between the second end of the target rod 13332 and the second rotating shaft 132 in the first direction A, that is, the second displacement in the foregoing embodiments.

It should be noted that the adjustment bracket 1331 is provided with a through hole 13313, and the target rod 13332 is lifted and lowered in the first direction A through the through hole 13313. At this time, the first direction A can also be referred to as the axial direction of the through hole 13313, and can also have an angle with the axial direction of the through hole 13313. The through hole 13313 only needs to be able to ensure that the target rod 13332 can be lifted and lowered in the first direction A through the through hole 13313. The second body is provided with a lifting hole corresponding to the through hole 13313 and capable of ensuring that the target rod 13332 can be lifted and lowered in the first direction A such that when the second body 12 abuts against the bearing surface, the second body 12 can be lifted.

In addition, a target slot 133311 can be arranged on the target control block 13331, and the first end of the target rod 13332 can be movably disposed in the target slot 133311. The target rod 13332 can be pulled up and down in the first direction A by the change of the target slot 133311, thereby changing the distance between the second end of the target rod 13332 and the second rotating shaft 132 in the first direction A. It should be noted that the height of the target slot 133311 may be related to the lifting height of the target rod 13332. The higher the target slot 133311 is, the higher the lifting height of the target rod 13332 is. The lower the target slot 133311 is, the lower the lifting height of the target rod 13332 is. Based on this, the slope of the target slot 133311 may be related to the rotation angle between the first rotating shaft 131 and the second rotating shaft 132. For example, the steeper the slope of the target slot 133311 is, the faster the rotation angle between the first rotating shaft 131 and the second rotating shaft 132; the gentler the slope of the target slot 133311 is, the slower the rotation angle between the first rotating shaft 131 and the second rotating shaft 132.

In some embodiments, the target slot 133311 may at least include a first slide slot 1333111 and a second slide slot 1333112. The first slide slot 1333111 may have a first angle with respect to the axis of the target rod 13332, and the second slide slot 1333112 may have a second angle with respect to the axis of the target rod 13332. The second slide slot 1333112 may be connected to the first slide slot 1333111 such that the target rod 13332 can move back and forth in the first direction A relative to the second rotating shaft 132. In some embodiments, the first angle and the second angle may be used to adjust the moving speed of the target rod 13332 in the first direction A.

It should be noted that the first angle and the second angle may be the same or different. When the first angle and the second angle are the same, the moving speed of the target rod 13332 may change at the same rate, when the first angle and the second angle are different, the moving speed of the target rod 13332 may change at different rates. That is, in the first slide slot 1333111 and the second slide slot 1333112, within the same rotation angle area, the moving speed of the target rod 13332 on the first slide slot 1333111 and the second slide slot 1333112 may be the same.

The target slot 133311 may include the first slide slot 1333111 and the second slide slot 1333112. The first end of the target rod 13332 can be movably disposed in the target slot 133311, and a sliding member 133321 can be disposed at the first end of the target rod 13332. The sliding member 133321 can be adapted to the first slide slot 1333111 and the second slide slot 1333112. The sliding member 133321 can slide along the first slide slot 1333111 and the second slide slot 1333112 to change the distance between the second end of the target rod 13332 and the second rotating shaft 132 in the first direction A. It should be noted that the distance between the adjustment assembly 133 and the second rotating shaft 132 in the first direction A may also be the distance between the first end of the target rod 13332 and the second rotating shaft 132 in the first direction A. The target slot 133311 may be divided into the first slide slot 1333111 and the second slide slot 1333112, which is convenient to process and manufacture. At the same time, by setting the first angle and the second angle differently, the moving speed of the target rod 13332 can be different, and the change rate of the target distance can be different, thereby meeting different needs of users.

The first slide slot 1333111 includes a first end and a second end, and the height difference between the first end and the second end may be a first distance. The first distance may be the first movement amount for adjusting the target rod 13332 to move along the first direction A. The second slide slot 1333112 includes a third end and a fourth end, and the height difference between the third end and the fourth end may be a second distance. The second distance may be the second movement amount for adjusting the target rod 13332 to move along the first direction A. When the first distance and the second distance are the same, the change in height difference of the target rod may be the same. When the first distance and the second distance are different, the change in height difference of the target rod may be different.

In some embodiments, the target slot 133311 includes the first slide slot 1333111 and the second slide slot 1333112 that are symmetrically arranged, and the first distance and the second distance are the same. That is, the height difference generated after the target rod 13332 passes through the first end and the second end of the first slide slot 1333111 is the same as the height difference generated after the target rod 13332 passes through the third end and the fourth end of the second slide slot 1333112.

Figure 14:
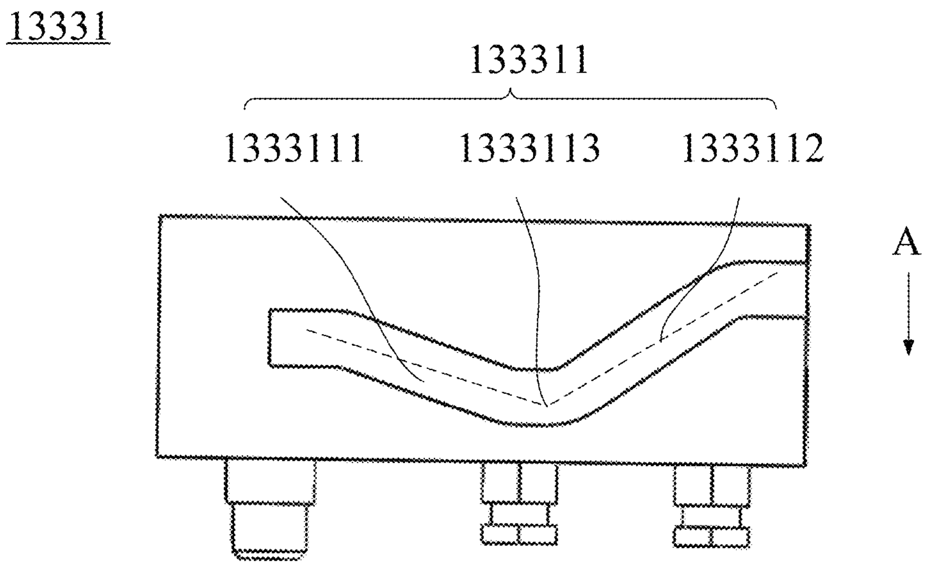
FIG. 14 is a schematic structural diagram of a lifting control block in the connecting device according to an embodiment of the present disclosure.
Figure 15:
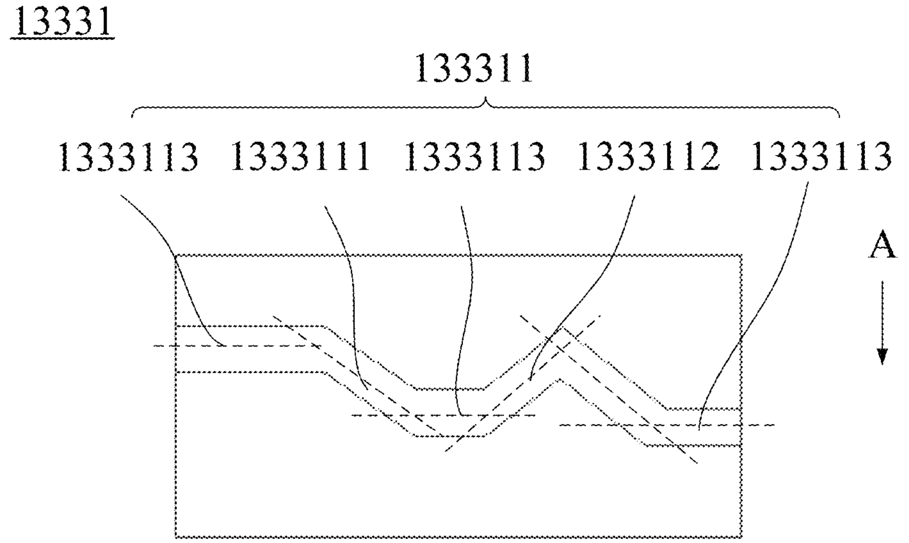
FIG. 15 is a schematic structural diagram of the lifting control block in the connecting device according to an embodiment of the present disclosure.

Refer to FIG. 14 and FIG. 15. In order for the first end of the target rod 13332 to slide smoothly through the connection between the first slide slot 1333111 and the second slide slot 1333112 when the first rotating shaft 131 and the second rotating shaft 132 rotate, and at the same time, when the first rotating shaft 131 and the second rotating shaft 132 are not rotating, the first end of the target rod 13332 is at the connection between the first slide slot 1333111 and the second slide slot 1333112, in some embodiments, the target slot 133311 may also include a third slide slot 1333113. The two ends of the third slide slot 1333113 may be connected to the first slide slot 1333111 and the second slide slot 1333112 respectively. When the rotation angles of the first rotating shaft 131 and the second rotating shaft 132, and the sliding member 133321 moves in the third slide slot 1333113, the distance between the first end of the target rod 13332 and the second rotating shaft 132 in the first direction A can remain unchanged. That is, there is no height difference between the fifth end and the sixth end of the third slide slot 1333113, which is a parallel groove, where the third slide slot 1333113 and the surface of the adjustment bracket 1331 meet the parallel condition.

Based on this, the sixth end of the third slide slot 1333113 may also be connected to the first end of the first slide slot 1333111. When the rotation angle of the first rotating shaft 131 and the second rotating shaft 132 changes, the sliding member 133321 is located in the third slide slot 1333113, and the distance between the first end of the/target rod 13332 and the second rotating shaft 132 in the first direction A remains unchanged. That is, there is no third movement amount until the rotation reaches the first slide slot 1333111, and the distance between the first end of the target rod 13332 and the second rotating shaft 132 in the first direction A changes, and the first movement amount is generated.

In addition, the fifth end of the third slide slot 1333113 may also be connected to the fourth end of the second slide slot 1333112. When the rotation angle of the first rotating shaft 131 and the second rotating shaft 132 changes, the sliding member 133321 is located in the third slide slot 1333113, and the distance between the first end of the target rod 13332 and the second rotating shaft 132 in the first direction A remains unchanged. That is, there is no third movement amount until the rotation reaches the second slide slot 1333112, and the distance between the first end of the target rod 13332 and the second rotating shaft 132 in the first direction A changes, and the second movement amount is generated.

Refer to FIGS. 7-10. A foot pad 134 is provided at the second end of the target rod 13332. The abuts against the bearing surface 2 and can be made of elastic material. The first end of the target rod 13332 is movably disposed in the target slot 133311. The target rod 13332 can be pulled up and down in the first direction A by changing the height of the target slot 133311, thereby changing the distance between the second end of the target rod 13332 and the second rotating shaft 132 in the first direction A to drive the foot pad 134 up or down.

In some embodiments, the foot pad 134 can be wrapped around the second end of the target rod 13332, and raised and lowered synchronously with the target rod, and extended relative to the second body 12 or retracted into an accommodation space of the second body 12. The foot pad 134 may also be connected to the second body 12. The foot pad 134 may be arranged corresponding to the target hole. The second end of the target rod 13332 may be connected to the foot pad 134, and may be lifted relative to the second body 12 to change the distance between the foot pad 134 and the second body 12.

In some embodiments, the connecting device 13 may include a third drive assembly 1334. The first drive assembly 1332 and the second drive assembly 1333 may be connected and matched by the third drive assembly 1334. The first displacement may be converted into a third displacement by the third drive assembly 1334 in a third direction C in a transmission ratio to convert the third displacement of the third drive assembly 1334 in the third direction C into the second displacement of the second drive assembly 1333 in the first direction A. The third displacement may be greater than the first displacement, and the third direction C may have an angle with the first direction A and the second direction B.

In some embodiments, the first drive assembly 1332 and the second drive assembly 1333 may be connected and cooperate with each other through the third drive assembly 1334, and at the same time, the third displacement may be greater than the first displacement. By the movement of the first drive assembly 1332 in the second direction B and the movement of the third drive assembly 1334 in the third direction C, the third displacement of the third drive assembly 1334 in the third direction C can be converted into the second displacement of the second drive assembly 1333 in the first direction A.

It should be noted that the present disclosure does not limit the structure of the third drive assembly 1334 as long as the third drive assembly 1334 can cooperate with the first drive assembly 1332 such that the third drive assembly 1334 can move along the third direction C relative to the adjustment bracket 1331 to generate the third displacement.

Refer to FIGS. 7-9 and FIG. 12. The adjustment bracket 1331 includes a second limiting groove 13312, and the third drive assembly 1334 includes a second connecting rod 13341. The first end of the second connecting rod 13341 is connected to the second end of the first connecting rod 13322 of the first drive assembly 1332 through a first fulcrum 13342. The second end of the second connecting rod 13341 is slidably disposed in the second limiting groove 13312 through a second fulcrum 13343 such that the second end of the second connecting rod 13341 can slide in the second limiting groove 13312 along the third direction C to generate the third displacement, which is easy to operate and process.

It should be noted that the first connecting rod 13322 is connected to the second connecting rod 13341, and the second connecting rod 13341 changes the displacement in the second direction B into the displacement in the first direction A through the first fulcrum 13342. The distance between the first end of the second connecting rod 13341 and the first fulcrum 13342 is smaller than the distance between the second end of the second connecting rod 13341 and the first fulcrum 13342, and the small displacement distance of the first connecting rod 13322 along the second direction B is changed into the large displacement distance of the second end of the second connecting rod 13341 in the second limiting groove 13312. The second end of the second connecting rod 13341 is connected to the second drive assembly 1333 through the second fulcrum 13343 and moves synchronously. The second drive assembly 1333 moves a larger distance in the second limiting groove 13312. In this way, the distance between the second end of the target rod 13332 and the second rotating shaft 132 in the first direction A is increased to generate the third displacement.

It should be noted that the present disclosure does not limit the shape of the second limiting groove 13312 on the adjustment bracket 1331, which can be a long strip, a circle, a square, etc., as long as the second end of the second connecting rod 13341 can move along the third direction C in the second limiting groove 13312.

Figure 3:
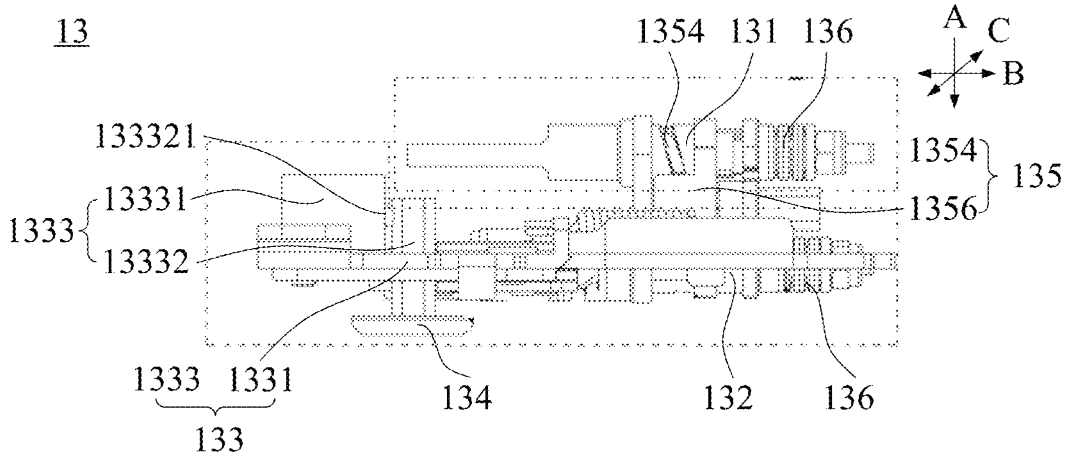
FIG. 3 is a schematic structural diagram in which outer circumferences of a first rotating shaft and a second rotating shaft are arranged with spiral grooves according to an embodiment of the present disclosure.
Figure 4:
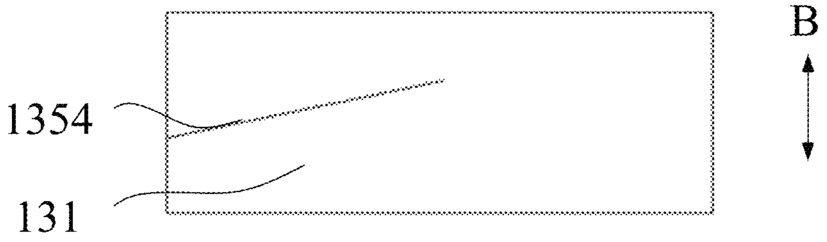
FIG. 4 is a schematic structural diagram in which a first spiral groove is arranged on the outer circumference of the first rotating shaft according to an embodiment of the present disclosure.
Figure 5:
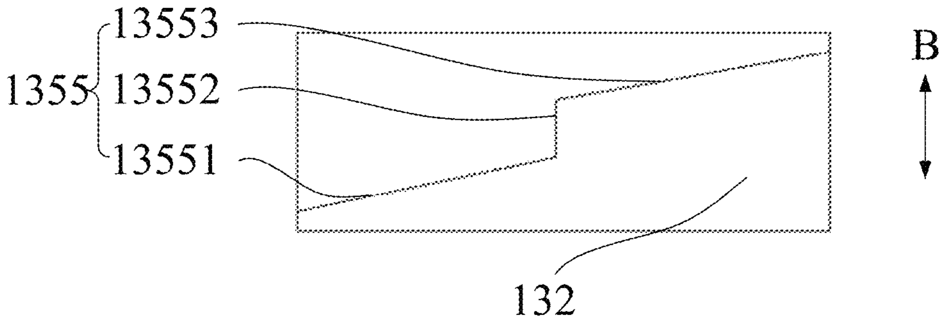
FIG. 5 is a schematic structural diagram in which a second spiral groove is arranged on the outer circumference of the second rotating shaft according to an embodiment of the present disclosure.
Figure 6:
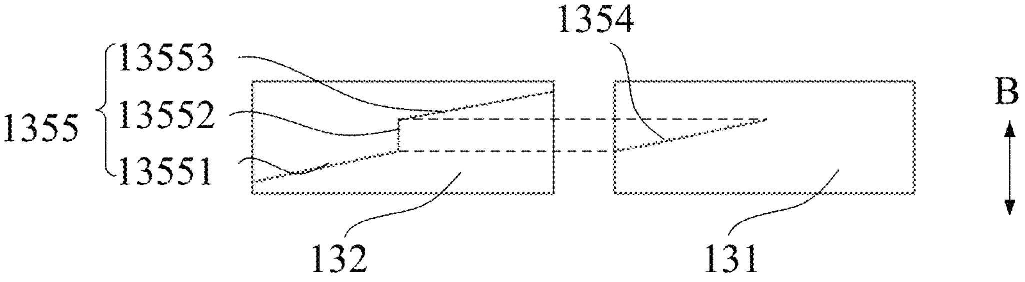
FIG. 6 is a schematic structural diagram in which an axial distance of a second groove of the second spiral groove along the axis of the second rotating shaft is the same as the axial distance of two ends of the first spiral groove along the axis of the first rotating shaft according to an embodiment of the present disclosure.
Figure 7:
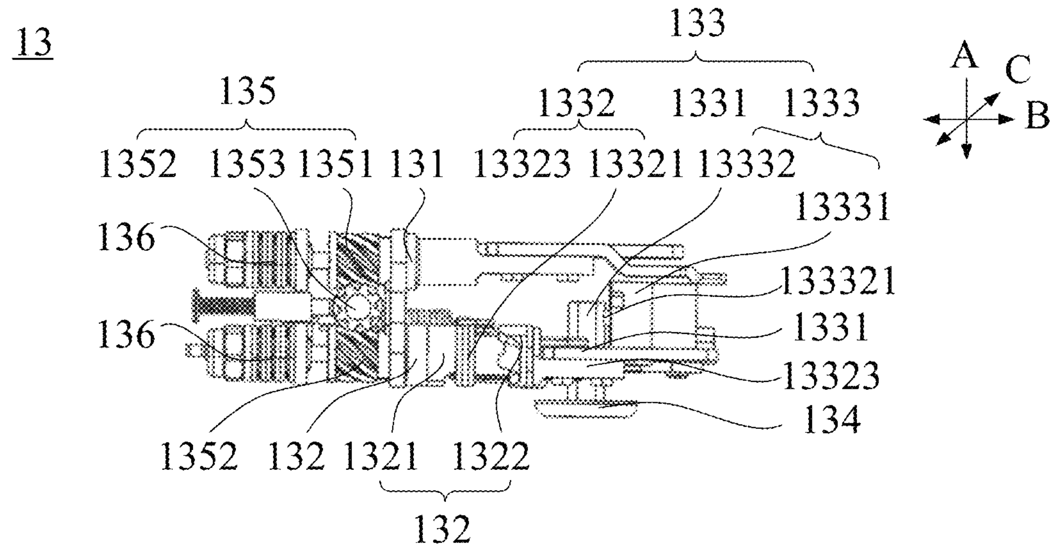
FIG. 7 is a schematic structural diagram in which the first rotating shaft and the second rotating shaft are driven by transmission gears according to an embodiment of the present disclosure.
Figure 8:
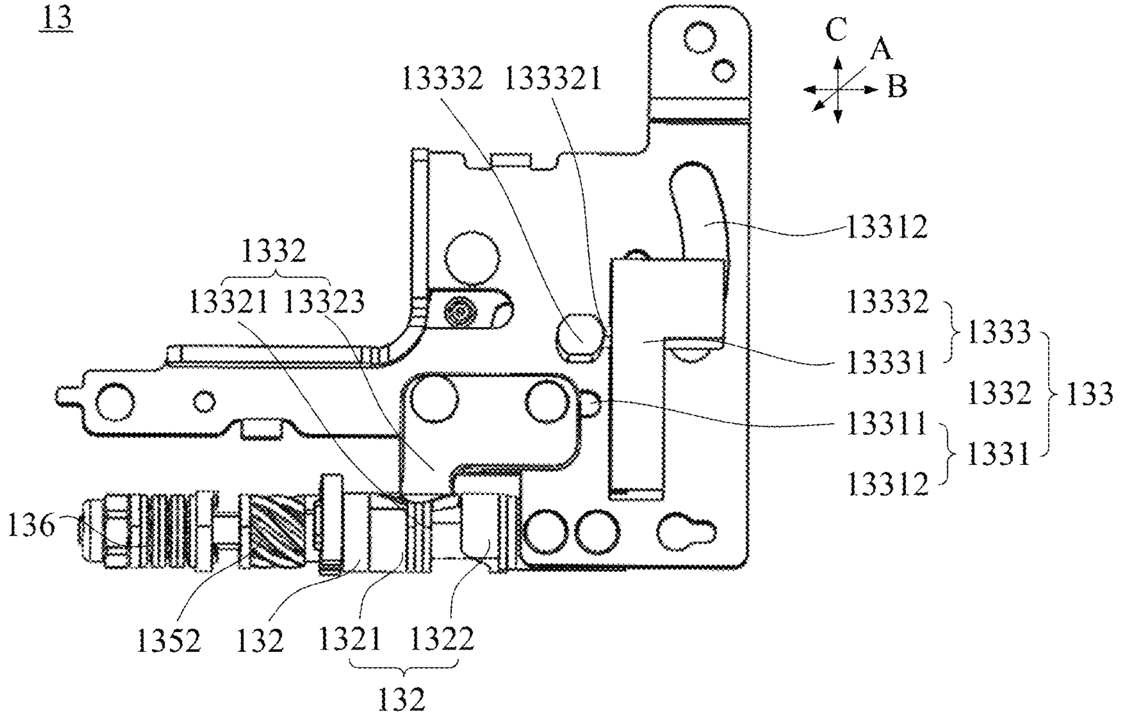
FIG. 8 is a schematic structural diagram of a connecting device according to an embodiment of the present disclosure.
Figure 9:
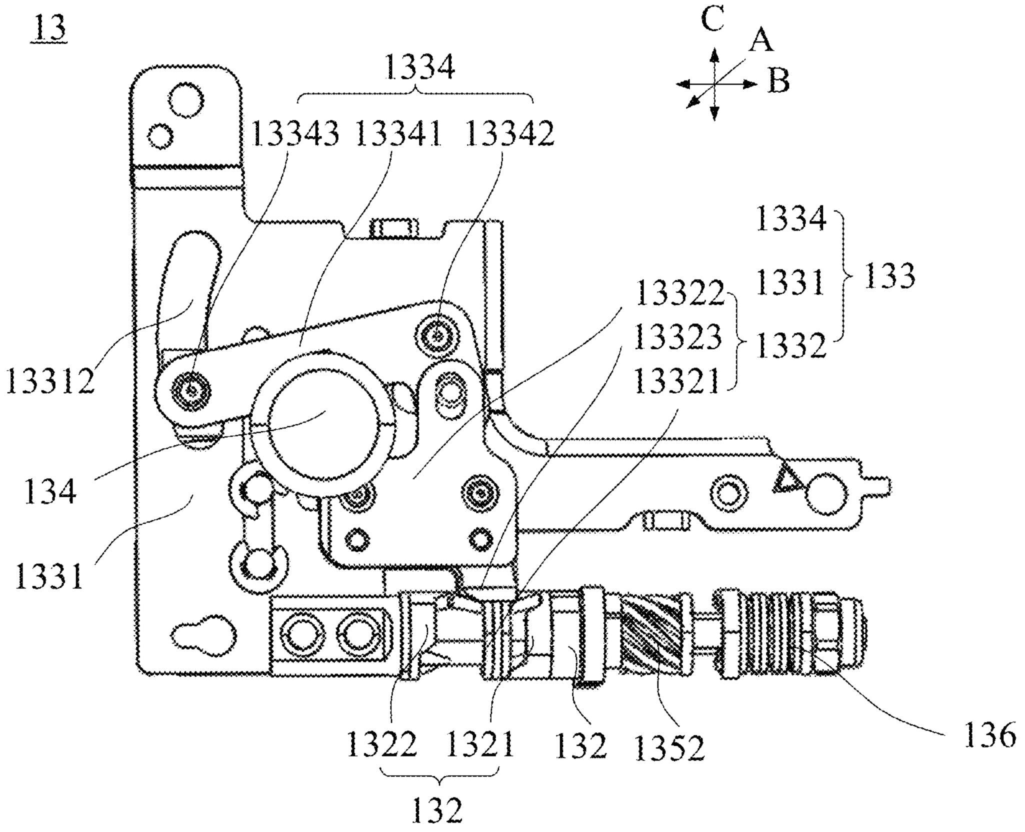
FIG. 9 is a schematic structural diagram of the connecting device according to an embodiment of the present disclosure.
Figure 10:
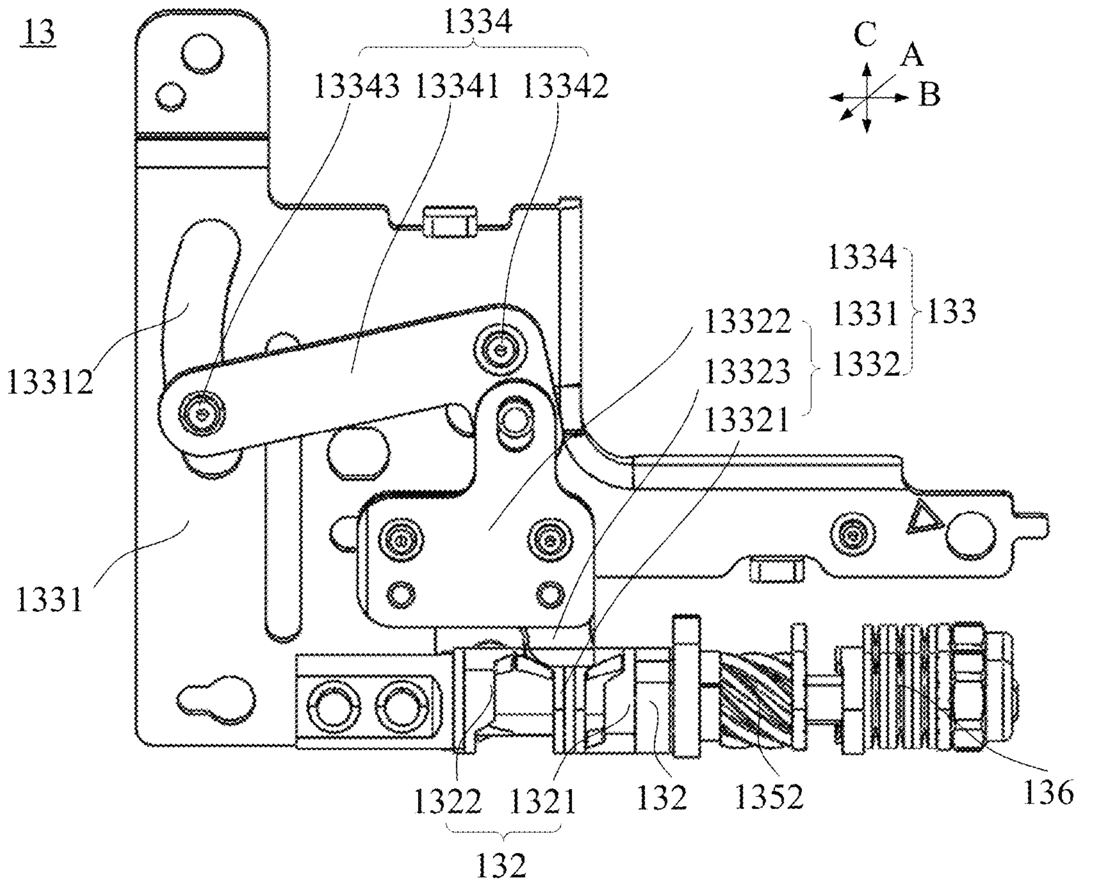
FIG. 10 is a schematic structural diagram of the connecting device without a foot pad and a second drive assembly according to an embodiment of the present disclosure.
Figure 11:
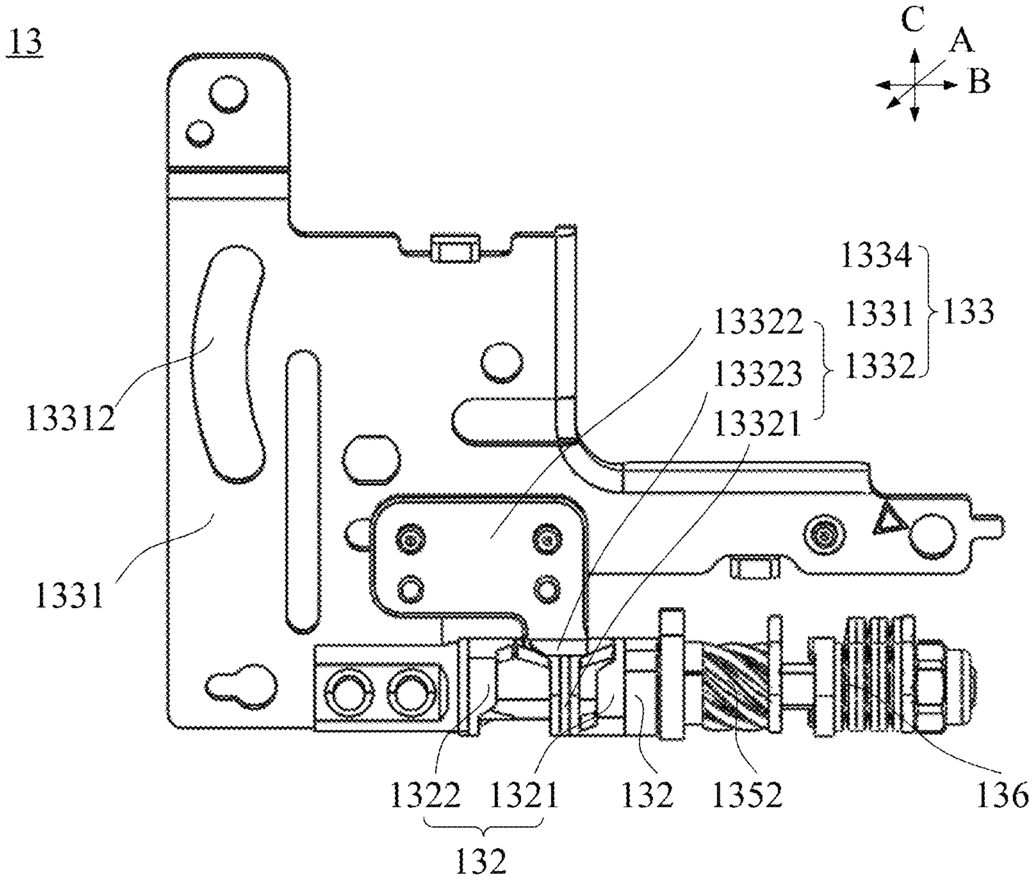
FIG. 11 is a schematic structural diagram of the connecting device without the foot pad, the second drive assembly and a third drive assembly according to an embodiment of the present disclosure.
Figure 12:
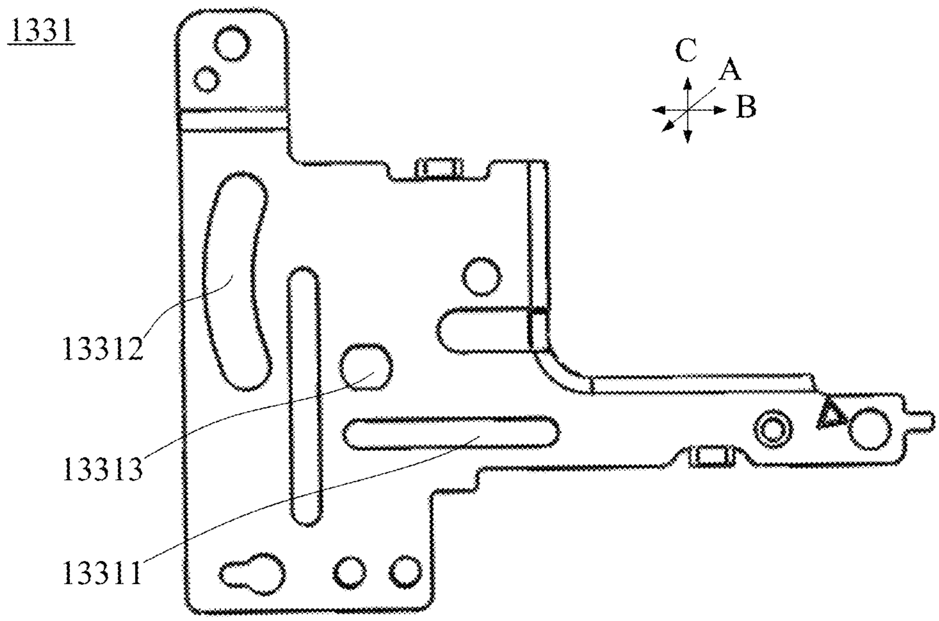
FIG. 12 is a schematic structural diagram of an adjustment bracket in the connecting device according to an embodiment of the present disclosure.
Figure 13:
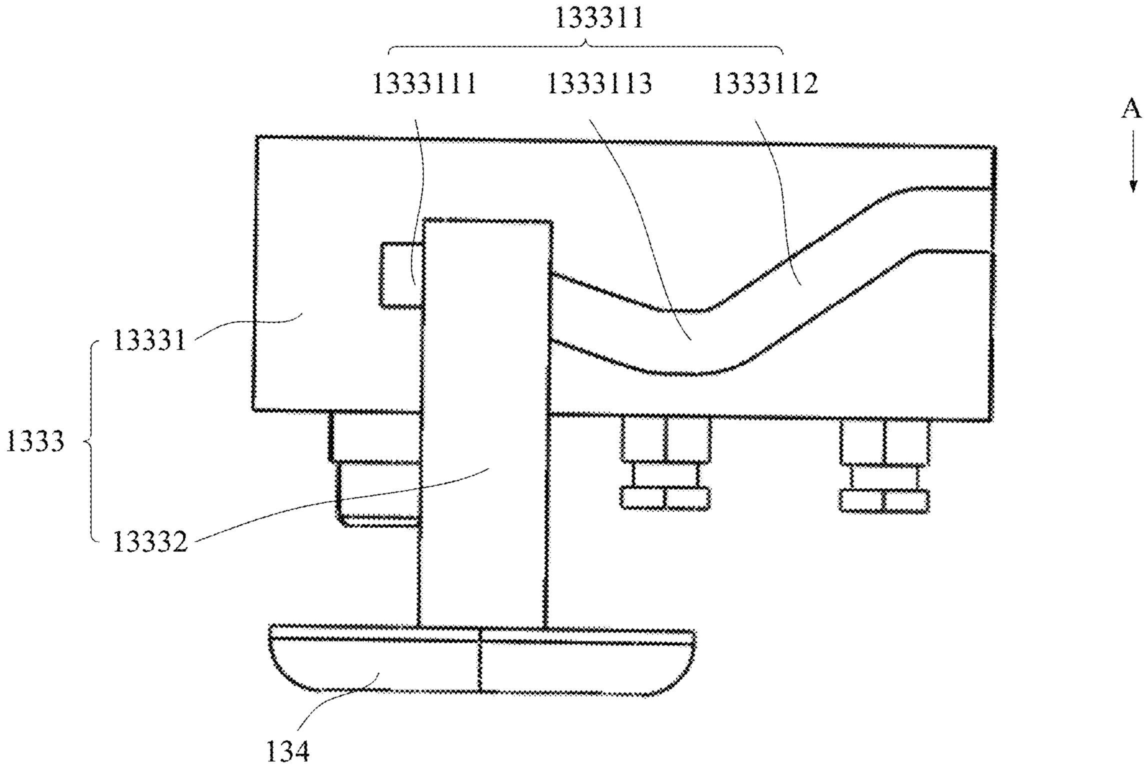
FIG. 13 is a schematic structural diagram of the foot pad and the second drive assembly in the connecting device according to an embodiment of the present disclosure.

Refer to FIG. 3 and FIG. 7. A linkage mechanism 135 is disposed between the first rotating shaft 131 and the second rotating shaft 132 such that the first rotating shaft 131 and the second rotating shaft 132 can be linked together. Being linked together may indicate that two or more axes that are linked together such that when one axis moves, the other axis moves synchronously or periodically. It should be noted that the linkage mechanism 135 may be a synchronous type of mechanism or a non-synchronous type of mechanism, which is not limited in the embodiments of the present disclosure.

The linkage mechanism 135 may be a synchronous type of mechanism. For example, the linkage mechanism 135 may be configured to drive the second rotating shaft 132 to rotate along the axis of the second rotating shaft 132 when the first rotating shaft 131 rotates along the axis of the first rotating shaft 131. A first gear 1351 may be arranged on the first rotating shaft 131, and a second gear 1352 may be arranged on the second rotating shaft 132. The first gear 1351 and the second gear 1352 may be connected through a transmission gear 1353 such that the first rotating shaft 131 and the second rotating shaft 132 can rotate synchronously. Alternatively, the outer circumference of the first rotating shaft 131 may include a first spiral groove 1354 extending around the axis of the first rotating shaft 131, and the outer circumference of the second rotating shaft 132 may include a second spiral groove 1355 corresponding to the first rotating shaft 131 formed on its outer circumference extending around the axis of the second rotating shaft 132. The first rotating shaft 131 and the second rotating shaft 132 may be connected by a guide 1356. The guide 1356 matches the first spiral groove 1354 and the second spiral groove 1355, and the first rotating shaft 131 and the second rotating shaft 132 can rotate synchronously through the guide 1356.

The linkage mechanism 135 may be a non-synchronous type of mechanism. For example, refer to FIGS. 3-6. The linkage mechanism 135 includes a first spiral groove 1354 extending around the axis of the first rotating shaft 131 on the outer circumference of the first rotating shaft 131, and the second spiral groove 1355 extending around the second rotating shaft 132 corresponding to the first rotating shaft 131 on the outer circumference of the second rotating shaft 132. The first rotating shaft 131 and the second rotating shaft 132 are connected by the guide 1356. The guide 1356 includes a first slider and a second slider which are arranged opposite to each other. The first slider is disposed in the first spiral groove 1354 and can slide along the first spiral groove 1354. The second slider is disposed in the second spiral groove 1355 and can slide along the second spiral groove 1355 to switch the rotation between the first rotating shaft 131 and the second rotating shaft 132. The second spiral groove 1355 includes a first groove 13551, a second groove 13552, and a third groove 13553. The axial distance of the second groove 13552 along the axis of the second rotating shaft 132 is the same as the axial distance of the two ends of the first spiral groove 1354 along the axis of the first rotating shaft 131.

Compared with the mechanism with synchronous linkage mechanism, the non-synchronous linkage mechanism of linkage mechanism 135 can reduce the visual occupation of user. Therefore, in some embodiments, the linkage mechanism 135 includes a first spiral groove 1354 extending around the axis of the first rotating shaft 131 on the outer circumference of the first rotating shaft 131, and the second spiral groove 1355 extending around the second rotating shaft 132 corresponding to the first rotating shaft 131 on the outer circumference of the second rotating shaft 132. The first rotating shaft 131 and the second rotating shaft 132 are connected by the guide 1356. The guide 1356 includes a first slider and a second slider which are arranged opposite to each other. The first slider is disposed in the first spiral groove 1354 and can slide along the first spiral groove 1354. The second slider is disposed in the second spiral groove 1355 and can slide along the second spiral groove 1355 to switch the rotation between the first rotating shaft 131 and the second rotating shaft 132. The second spiral groove 1355 includes a first groove 13551, a second groove 13552, and a third groove 13553. The axial distance of the second groove 13552 along the axis of the second rotating shaft 132 is the same as the axial distance of the two ends of the first spiral groove 1354 along the axis of the first rotating shaft 131. At this time, when the first rotating shaft 131 is in the first spiral groove 1354, the second rotating shaft 132 is in the second groove 13552, and the rotation of the first rotating shaft 131 relative to the second rotating shaft 132 cannot change the distance between the adjustment assembly 133 and the second rotating shaft 132 in the first direction A.

It should be noted that the first slider is disposed in the first spiral groove 1354. When the second slider is disposed in the first groove 13551 of the second spiral groove 1355, the second slider cooperates with the first slider to rate the first rotating shaft 131 and the second rotating shaft 132 within the first angle range. When the second slider is disposed in the second groove 13552 of the second spiral groove 1355, the second slider cooperates with the first slider to rotate the first rotating shaft 131 and the second rotating shaft 132 within the second angle range. When the second slider is disposed in the third groove 13553 of the second spiral groove 1355, the second slider cooperates with the first slider to enable the first rotating shaft 131 and the second rotating shaft 132 to rotate within the third angle range.

An embodiment of the present disclosure also provides an electronic device. The electronic device includes a first body 11, a connecting device 13, and a second body 12. The first body 11 has a first surface 111 and a second surface 112 disposed opposite to each other, and the second body 12 has a third surface 121 and a fourth surface 122 disposed opposite to each other. The second body 12 is connected to the first body 11 through the connecting device 13. During the process of the first body 11 flipping over to the target state relative to the second body 12, the support surface of the second body 12 for contacting with the bearing surface 2 is adjusted to be close to the second body 12. The target state is that the first surface 111 of the first body 11 serving as the bearing surface in contact with the supporting surface of the second body 12. That is, the process of the first body 11 and the second body 12 opening. Similarly, when the first body 11 and the second body 12 are flipped from the target state to the initial state, it can also be the state of the first body 11 and the second body 12 closing.

It should be noted that when the first body 11 and the second body 12 are in the initial state, the fourth surface 122 of the second body 12 can be a supporting surface in contact with the bearing surface 2, or a supporting surface can be provided on the fourth surface 122, and the supporting surface is in contact with the bearing surface 2. When the first body 11 and the second body 12 are in the target state, the first surface 111 of the first body 11 contacts the supporting surface of the second body 12, and the first surface 111 serves as the supporting surface.

The bearing surface 2 is the surface that bears the connecting device. The bearing surface 2 can be a desktop or the ground.

For example, in the first stage of the process of the first body 11 flipping relative to the second body 12 to the target state, the supporting surface of the second body 12 for contacting the bearing surface is adjusted away from the initial position. In the second stage of the process of the first body 11 flipping relative to the second body 12 to the target state, the supporting surface of the second body 12 for contacting the bearing surface 2 is adjusted from away from the second body 12 to close to the second body 12.

Based on this, the first stage is when the connecting end of the first body 11 is close to the bearing surface 2, and the supporting surface of the second body 12 used for the bearing surface 2 is away from the initial position such that the connecting end can be prevented from colliding with the bearing surface. Similarly, in the second stage, the connecting end of the first body 11 is away from the bearing surface 2, the supporting surface of the second body 12 for the bearing surface 2 is close to the initial position, and the connecting end is away from the bearing surface, and no collision will occur at this time. In addition, the supporting surface of the second body 12 for contacting the bearing surface 2 is close to the initial position, which is beneficial for heat dissipation.

It should be noted that the first stage can be carried out simultaneously with the direction in which the first rotating shaft 131 and the second rotating shaft 132 rotate. Alternatively, the first rotating shaft 131 and the second rotating shaft 132 may rotate first, and then the first stage may be carried out, which is not limited in the embodiments of the present disclosure.

In some embodiments, the electronic device further includes a support 134, which is connected to the connecting device 13. The support 134 is disposed on the fourth surface 122 of the second body 12, and is used to support the second body 12 when the second body 12 is disposed relative to the bearing surface 2. The support 134 can reciprocate along the first direction A to change the distance between the second body 12 and the bearing surface 2.

Refer to FIGS. 1-2 and FIGS. 7-9. In order to protect the adjustment assembly 133 and at the same time provide a buffering effect on the bearing surface 2 and the electronic device 1, the support 134 may be a foot pad (the reference numeral of the foot pad is the same as the reference numeral of the support). The foot pad 134 is connected to the adjustment assembly 133. The foot pad 134 is used to abut against the bearing surface 2. The foot pad 134 can reciprocate along the first direction A to change the distance between the second body 12 and the bearing surface 2. The foot pad 134 may be made of elastic material.

The projection of the foot pad 134 provided in the embodiments of the present disclosure along the second rotation axis in the first direction A may be a regular shape such as a rectangle, a square, etc., or an irregular shape, which is not limited in the embodiments of the present disclosure. In some embodiments, the projection of the foot pad 134 along the second rotation axis in the first direction A may be circular such that the friction force on the foot pad 134 when moving relative to the bearing surface is the same, which is convenient for processing and manufacturing.

Since the adjustment assembly 133 is connected to the second rotating shaft 132, the change of the rotation angle of the second rotating shaft 132 relative to the first rotating shaft 131 can change the distance between the adjustment assembly 133 and the second rotating shaft 132 in the first direction A. The foot pad 134 is connected to the adjustment assembly 133 and is used to abut against the bearing surface 2. At this time, the rotation angle of the second rotating shaft 132 relative to the first rotating shaft 131 can also correspondingly change the distance between the second rotating shaft 132 and the bearing surface 2 in the first direction A.

The foot pad 134 prevents the bottom surface of the second body 12 of the electronic device from being scratched. At the same time, the foot pad 134 has a certain thickness, and the foot pad 134 is connected to the adjustment assembly 133 such that the distance between the second rotating shaft 132 and the bearing surface 2 in the first direction A is increased, thereby enhancing the heat dissipation effect.

Refer to FIGS. 1-2 and FIGS. 7-9. In some embodiments, the adjustment assembly 133 is disposed in the accommodation space of the second body 12. The second body 12 has a first housing and a second housing forming an accommodation space, and the adjustment bracket 1331 of the adjustment assembly 133 is fixedly connected to the first housing; or the adjustment bracket 1331 of the adjustment assembly 133 is fixedly connected to the second housing.

It should be noted that the adjustment assembly 133 is disposed in the accommodation space of the second body 12. The second body 12 has a first housing and a second housing forming the accommodation space. The adjustment bracket 1331 of the adjustment assembly 133 can be fixedly connected to the first housing, or fixedly connected to the second housing. When the adjustment bracket 1331 of the adjustment assembly 133 is fixed connected to the first housing, the change in rotation angle of the second rotating shaft 132 relative to the first rotating shaft 131 drives the first housing to move closer to or away from the second housing, thereby changing the spacing of the adjustment assembly 133 along the second rotating shaft 132 in the first direction A. When the adjustment bracket 1331 of the adjustment assembly 133 is fixedly connected to the second housing, the change in rotation angle of the second rotating shaft 132 relative to the first rotating shaft 131 drives the second housing to move closer to or away from the first housing, thereby changing the spacing of the adjustment assembly 133 along the second rotating shaft 132 in the first direction A. The adjustment assembly 133 is disposed on the first side of the first housing and the second housing. One side of the adjustment assembly 133 is connected to the first housing, and the other side of the adjustment assembly 133 is connected to the second housing. The spacing between the adjustment assembly and the second rotating shaft in the first direction can change to cause the first housing and the second housing to be lifted or lowered relative to each other on the first side. The spacing of the adjustment assembly 133 along the second rotating shaft 132 in the first direction A can change to change the size of the accommodation space, which is beneficial to the air intake and effective heat dissipation of the second body.

Based on this, when the adjustment bracket 1331 of the adjustment assembly 133 is fixedly connected to the first housing, the foot pad 134 can also be arranged on the side of the first housing opposite to the second housing, and the change of the rotation angle of the second rotating shaft 132 relative to the first rotating shaft 131 can drive the first housing to move closer to or away from the second housing to change the spacing of the adjustment assembly 133 along the second rotating shaft 132 in the first direction A. At this time, foot pad 134 abuts against the bearing surface 2. Similarly, when the adjustment bracket 1331 of the adjustment assembly 133 is fixedly connected to the first housing, the foot pad 134 can also be arranged on the side of the second housing opposite to the first housing. The rotation angle of the second rotating shaft 132 relative to the first rotating shaft 131 can drive the second housing to move closer or away from the first housing, thereby changing the spacing of the adjustment assembly 133 along the second rotating shaft 132 in the first direction A. Similarly, the foot pad 134 also abuts against the bearing surface 2. In some embodiments, in order to buffer the contact between the foot pad 134 and the bearing surface 2 and protect the bearing surface 2, the foot pad 134 may be made of an elastic material.

In some embodiments, the rotation state of the first body 11 relative to the second body 12 includes at least an initial state and a target state. When the first body 11 rotates relative to the second body 12 to the initial state, the second rotating shaft 132 rotates relative to the first rotating shaft 131 to the first position. When the first body 11 rotates relative to the second body 12 to the target state, the second rotating shaft 132 rotates relative to the first rotating shaft 131 to the third position. The connecting device 13 can move relative to the second body 12, and the target object 13332 of the connecting device 13 can reciprocate along the first direction A to change the distance between the second body 12 and the bearing surface 2.

In some embodiments, the rotation state of the first body 11 relative to the second body 12 at least further includes a working state. The working state is between the initial state and the target state. When the first body 11 rotates relative to the second body 12 to the working state, the second rotating shaft 132 rotates relative to the first rotating shaft 131 to the second position. During the process of rotating from the initial state to the working state, the distance between the second body 12 and the bearing surface 2 increases, and during the process of rotating from the working state to the target state, the distance between the second body 12 and the bearing surface 2 decreases.

In some embodiments, when the rotation of the first body 11 relative to the second body 12 switches from the initial state to the target state and the first body 11 rotates relative to the second body 12 by the first preset angle, the distance between the connecting device 13 and the second body 12 in the first direction A is changed. When the first body 11 rotates relative to the second body 12 to the second preset angle, the distance between the connecting device 13 and the second body 12 in the opposite direction of the first direction A is changed. The first preset angle and the second preset angle may be different.

Based on this, when the first body 11 rotates relative to the second body 12 to the initial state or the target state, the rotation position of the second rotating shaft 132 relative to the first rotating shaft 131 is between the first position and the third position, and the height of the foot pad 134 extending from the second body 12 is the first height. When the first body 11 rotates relative to the second body 12 to the working state, the rotation position of the second rotating shaft 132 relative to the first rotating shaft 131 is the second position, and the height of the foot pad 134 extending from the second body 12 is the second height. The first height and the second height may be different.

The above are only preferred embodiments of the present disclosure and are not used to limit the scope of the present invention. Any modifications, equivalent substitutions and improvements made within the spirit and principles of the present disclosure shall be included in the protection scope of the present disclosure.

What is claimed is:

1. A connecting device comprising:

a first rotating shaft, the first rotating shaft being used to connect with a first body;

a second rotating shaft, the second rotating shaft being parallel to the first rotating shaft and used to connect with a second body; and an adjustment assembly, the adjustment assembly being rotatably matched with the second rotating shaft, wherein:

a rotation angle of the second rotating shaft relative to the first rotating shaft changes to cause a target object of the adjustment assembly to move relative to the second rotating shaft, the target object reciprocating along a first direction to change a target distance with the second rotating shaft;

the first direction and an axial direction of the second rotating shaft form an angle; and the adjustment assembly includes:

a first drive assembly, the first drive assembly being connected to the second rotating shaft, the first drive assembly being configured to reciprocate relative to the second rotating shaft along a second direction with a first displacement; and a second drive assembly, the second drive assembly being configured to cooperate with the first drive assembly to convert a first displacement of the first drive assembly in the second direction into a second displacement of the second drive assembly in the first direction, the second drive assembly being configured to move back and forth relative to the second rotating shaft along the first direction to change the target distance, the second direction being the same as the axial direction of the second rotating shaft.

2. The connecting device of claim 1, wherein the adjustment assembly further includes:

a third drive assembly, the first drive assembly and the second drive assembly being connected and transmission-matched via the third drive assembly, the first displacement being converted into a third displacement by the third drive assembly in a third direction in a transmission ratio to cause the third displacement of the third drive assembly in the third direction to be converted into the second displacement of the second drive assembly in the first direction;

the third displacement being greater than the first displacement; and the third direction having an angle with both the first direction and the second direction.

3. The connecting device of claim 1, wherein:

the second drive assembly includes a target control block having a target slot formed thereon, and the target object is a target rod, a first end of the target rod being movably disposed in the target slot, the target rod being configured to be pulled to move in the first direction by a change of height difference of the target slot to change the target distance between a second end of the target rod and the second rotating shaft in the first direction.

4. The connecting device of claim 3, wherein the target slot includes:

a first slide slot, the first slide slot having a first angle with respect to a target rod axis; and a second slide slot, the second slide slot having a second angle with respect to the target rod axis, the second slide slot being connected to the first slide slot for the target rod to reciprocate in the first direction relative to the second rotating shaft, the first angle and the second angle being used to adjust a moving speed of the target rod in the first direction.

5. The connecting device of claim 4, wherein:

the first slide slot has a first end and a second end, the height difference between the first end and the second end being a first distance, the first distance being a first movement amount for adjusting the movement of the target rod along the first direction; and the second slide slot has a third end and a fourth end, the height difference between the third end and the fourth end being a second distance, the second distance being a second movement amount for adjusting the movement of the target rod along the first direction, wherein:

when the first distance and the second distance are the same, the height difference of the target rod changes consistently, when the first distance and the second distance are different, the height difference of the target rod changes differently.

6. An electronic device comprising:

a first body, the first body having a first surface and a second surface disposed opposite each other;

the connecting device according to claim 1; and a second body, the second body having a third surface and a fourth surface disposed opposite each other, the second body being connected to the first body through the connecting device, wherein:

during a process of the first body flipping relative to the second body to a target state, a supporting surface of the second body for contacting a bearing surface is adjusted to be close to the second body, the target state being a state in which the first surface of the first body serves as the bearing surface in contact with the supporting surface of the second body.

7. The electronic device of claim 6, wherein:

in a first stage of the process in which the first body is flipped relative to the second body to the target state, the supporting surface of the second body for contacting the bearing surface is adjusted to be away from an initial position; and in a second stage of the process in which the first body is flipped relative to the second body to the target state, the supporting surface of the second body for contacting the bearing surface is adjusted from away from the second body to close to the second body.

8. The electronic device of claim 7, wherein:

the first stage is a stage in which a connecting end of the first body is turned over to be close to the bearing surface, and the supporting surface of the second body for contacting the bearing surface is away from the initial position.

9. The electronic device of claim 6, further comprising:

a support, the support being connected with the connecting device, the support being disposed on the fourth surface of the second body to prop up the second body when the second body is disposed relative to the bearing surface, the support being configured to reciprocate along a first direction to change a distance between the second body and the bearing surface.

* * * * *